US009736369B2

United States Patent
Shafir

(10) Patent No.: US 9,736,369 B2
(45) Date of Patent: Aug. 15, 2017

(54) VIRTUAL VIDEO PATROL SYSTEM AND COMPONENTS THEREFOR

(71) Applicant: SPO Systems Inc. Limited HK

(72) Inventor: Michael (Micha) Shafir, Givat Shmuel (IL)

(73) Assignee: SPO SYSTEMS INC. LIMITED, Hong Kong (HK)

( * ) Notice: Subject to any disclaimer, the term of this patent is extended or adjusted under 35 U.S.C. 154(b) by 199 days.

(21) Appl. No.: 14/331,251

(22) Filed: Jul. 15, 2014

(65) Prior Publication Data

US 2015/0022630 A1    Jan. 22, 2015

Related U.S. Application Data

(60) Provisional application No. 61/847,585, filed on Jul. 18, 2013.

(51) Int. Cl.
| | |
|---|---|
| H04N 5/232 | (2006.01) |
| H04N 5/235 | (2006.01) |
| H04N 5/77 | (2006.01) |
| H04N 7/18 | (2006.01) |

(52) U.S. Cl.
CPC ....... H04N 5/23238 (2013.01); H04N 5/2354 (2013.01); H04N 5/23206 (2013.01); H04N 5/77 (2013.01); H04N 7/181 (2013.01)

(58) Field of Classification Search
CPC .......... H04N 5/23238; H04N 5/23206; H04N 7/181; H04N 5/2354; H04N 5/77
See application file for complete search history.

(56) References Cited

U.S. PATENT DOCUMENTS

| | | | |
|---|---|---|---|
| 6,175,382 B1 * | 1/2001 | Mohr | H04N 7/181 348/143 |
| 7,683,795 B2 * | 3/2010 | Bjorn | G01R 15/246 324/96 |
| 8,599,266 B2 | 12/2013 | Trivedi et al. | |

(Continued)

FOREIGN PATENT DOCUMENTS

| | | |
|---|---|---|
| CN | 101545599 A | 9/2009 |
| CN | 102665365 A | 9/2012 |

(Continued)

*Primary Examiner* — Sath V Perungavoor
*Assistant Examiner* — Philip Dang
(74) *Attorney, Agent, or Firm* — Mark M. Friedman

(57) ABSTRACT

A system and corresponding components for providing a virtual video patrol functionality comprised of a plurality of sensor units and a monitoring station. The sensor units are preferably deployed in a configuration such that physically adjacent sensor units have overlapping fields of view. Each sensor unit is preferably configured to generate and transmit an alert to the monitoring station upon the detection of an event. The monitoring station may request video data from a specifically addressed sensor unit as well as additional sensor units with fields of view overlapping with the specifically addressed sensor unit. Requested video data from sensor units may be processed and combined using stitching algorithms. A user input device and display in the monitoring station allows virtual panning of the combined video image. The sensor units are preferably implemented as street light sensor units combined with a street light illumination source.

13 Claims, 12 Drawing Sheets

(56) References Cited

U.S. PATENT DOCUMENTS

| | | |
|---|---|---|
| 2005/0185047 A1 | 8/2005 | Hii |
| 2006/0056855 A1 | 3/2006 | Nakagawa et al. |
| 2006/0238617 A1 | 10/2006 | Tamir |
| 2007/0174467 A1 | 7/2007 | Ballou, Jr. et al. |
| 2007/0279491 A1* | 12/2007 | Riviere ............... F21S 8/086 348/143 |
| 2009/0195653 A1* | 8/2009 | Miao ............... G08B 13/19632 348/149 |
| 2009/0262189 A1* | 10/2009 | Marman ......... G08B 13/19613 348/143 |
| 2010/0149335 A1* | 6/2010 | Miller, II ............... H04N 7/181 348/148 |
| 2010/0253318 A1* | 10/2010 | Thomas, Sr. ........... H01F 27/40 323/358 |
| 2011/0096168 A1* | 4/2011 | Siann ................... H04N 7/183 348/158 |
| 2012/0020060 A1 | 1/2012 | Myer |
| 2012/0098925 A1* | 4/2012 | Dasher ................. H04N 5/247 348/36 |
| 2012/0169842 A1 | 7/2012 | Chuang |
| 2013/0107041 A1* | 5/2013 | Norem ................. H04N 5/225 348/143 |
| 2013/0129304 A1 | 5/2013 | Feinson |

FOREIGN PATENT DOCUMENTS

| | | |
|---|---|---|
| CN | 102857739 A | 1/2013 |
| CN | 102938827 A | 2/2013 |
| EP | 2242252 | 10/2010 |
| WO | 93/19441 | 9/1993 |
| WO | 03073764 A1 | 4/2003 |

\* cited by examiner

VIRTUAL VIDEO PATROL SYSTEM AND COMPONENTS THEREFOR

FIELD AND BACKGROUND OF THE INVENTION

The present invention relates to information technology and processing and, in particular, it concerns a system and corresponding sensor units capturing video data in order to facilitate a real-time virtual video patrol.

It is known that virtual image panning from one angle to another is possible as exemplified by Google Maps Street View. However, the images in this technology are static and can be quite outdated. Additionally, according to current technology, no attempt is made to achieve any level of fidelity of images during a transition from one sampled image viewpoint to the next, often resulting in a loss of spatial awareness of the user during the transition.

In the context of a localized event venue, such as in a sports stadium, it has been proposed to provide a virtual video panning effect from one viewing region to another based on data from multiple video cameras (US 2012/0098925, Dasher et al). However, this virtual video panning is based upon simultaneous and continuous upload of streaming video from all of the video cameras, which renders the approach impractical for implementing in a large area system.

There is therefore a need for a system and corresponding components for providing a virtual video patrol functionality.

SUMMARY OF THE INVENTION

The present invention is a system and corresponding components for providing a virtual video patrol functionality.

According to the teachings of an embodiment of the present invention there is provided, a street light and sensor unit comprising: (a) a light source deployed for illuminating an first region; (b) an image sensor for capturing video data from a field of view having at least partial overlap with the first region; (c) a data processing unit associated with the image sensor comprising at least one processor and a data storage medium; (d) a communications subsystem associated with the data processing unit and configured for transmitting and receiving data over a wired or wireless network, the communications subsystem having an associated identifier, wherein the data processing unit is configured to actuate the communications subsystem to: (i) maintain indefinitely a low-bandwidth mode in which no video data is transmitted and the communications subsystem monitors for video data requests; and (ii) selectively on receipt of a video data request relating to the associated identifier, transmit video data derived from the image sensor.

According to a further feature of an embodiment of the present invention, the data processing unit is further configured to: (a) process the video data from the image sensor to monitor for events occurring within the field of view; and (b) on identifying an event occurring within the field of view that satisfies at least one alert criterion, actuate the communications subsystem to transmit an alert notification over the wired or wireless network while maintaining the low-bandwidth mode.

According to a further feature of an embodiment of the present invention, the street light and sensor unit is associated with an electric power line, and wherein the communications subsystem is configured for transmitting and receiving data via the electric power line.

There is also provided according to an embodiment of the present invention, a system comprising: (a) a plurality of the aforementioned street light and sensor units, wherein the plurality of street light and sensor units are deployed in spaced relation such that the fields of view provide continuous coverage of a scene; and (b) a monitoring station comprising: (i) a communications module in networked communication with the communications subsystems; (ii) a data processing system comprising at least one processor and a data storage medium, the data processing system being associated with the communications module; and (iii) a graphical user interface associated with the data processing system, the graphical user interface including a display and at least one user input device, wherein the monitoring station is responsive to an input via the at least one user input device to transmit a video request addressed to a first of the street light and sensor units and a second of the street light and sensor units having an overlapping field of view with the first of the street light and sensor units, and wherein the communications module is configured to receive video data associated with the video request to the first street light and sensor unit and to the second street light and sensor unit over the wired or wireless network, and wherein the data processing system is configured to generate from the video data a stitched video image for display via the graphical user interface.

According to a further feature of an embodiment of the present invention, the street light and sensor units are deployed in an elongated array.

According to a further feature of an embodiment of the present invention, the graphical user interface is responsive to an input via the at least one user input device to change from the selected street light and sensor unit to one of the street light and sensor units located physically adjacent to the selected street light and sensor unit.

According to a further feature of an embodiment of the present invention, the data processing unit is further configured to: (a) process the video data from the image sensor to monitor for events occurring within the field of view; and (b) on identifying an event occurring within the field of view that satisfies at least one alert criterion, actuate the communications subsystem to transmit an alert notification over the wired or wireless network while maintaining the low-bandwidth mode.

According to a further feature of an embodiment of the present invention, the communications module is further configured to receive alert notifications from physical locations over the wired or wireless network, and wherein the graphical user interface is configured to generate a display indicative of the physical locations from which the alert notifications have been received.

According to a further feature of an embodiment of the present invention, the street light and sensor unit is further configured to perform processing to track moving objects; and wherein the at least one alert criterion includes the movement of objects which violates at least one predefined rule.

According to a further feature of an embodiment of the present invention, the street light and sensor units are associated with an electric power line, and wherein the communications subsystems are configured for transmitting and receiving data via the electric power line.

According to a further feature of an embodiment of the present invention, the electric power line is connected to a mufti-phase electric power supply; and wherein each of the street light and sensor units are independently linked to at least one phase of the multi-phase electric power supply.

According to a further feature of an embodiment of the present invention, the image sensor is configured to capture video data from the field of view via infrared imaging.

According to a further feature of an embodiment of the present invention, the image sensor us configured to capture video data from the field of view via microwave imaging.

According to a further feature of an embodiment of the present invention, the street light and sensor unit further comprises an audio sensor for capturing audio data.

According to a further feature of an embodiment of the present invention, the monitoring station is responsive to an input via the at least one user input device to transmit an audio request addressed to a selected one of the street light and sensor units, and wherein each of the street light and sensor units is responsive to a correspondingly addressed audio request to transmit audio data to the monitoring station.

According to a further feature of an embodiment of the present invention, the street light and sensor unit further comprises a speaker system configured to play audio data.

According to a further feature of an embodiment of the present invention, the monitoring station further comprises: (a) an audio sensor for capturing audio data; and (b) a speaker system configured to play audio data.

According to a further feature of an embodiment of the present invention, the street light and sensor units and the monitoring station have audio intercommunications.

There is also provided according to an embodiment of the present invention, a monitoring station comprising: (a) a communications module configured for transmitting and receiving data over a wired or wireless network; (b) a data processing system comprising at least one processor and a data storage medium, the data processing system being associated with the communications module; (c) a graphical user interface associated with the processing system, the graphical user interface including a display and at least one user input device, wherein the monitoring station is responsive to an input via the at least one user input device to transmit a video request to a plurality of addresses over the wired or wireless network, and wherein the communications module is further configured to receive video data associated with the video request to the addresses over the wired or wireless network, and wherein the data processing system is configured to generate from the video data a stitched video image for display via the graphical user interface.

According to a further feature of an embodiment of the present invention, the communications module is further configured to receive alert notifications from physical locations over the wired or wireless network, and wherein the graphical user interface is configured to generate a display indicative of the physical locations from which the alert notifications have been received.

According to a further feature of an embodiment of the present invention, the monitoring station is associated with an electric power line, and wherein the communications module is configured for transmitting and receiving data via the electric power line.

There is also provided according to an embodiment of the present invention, a street light and sensor unit comprising: (a) a light source deployed for illuminating a first region; and (b) a sensor unit comprising: (i) an image sensor for capturing video data from a field of view having at least partial overlap with the first region; (ii) a data processing unit associated with the image sensor comprising at least one processor and a data storage medium, wherein the data processing unit is configured to adjust the brightness level of the light source, and wherein the sensor unit is configured to record video data to the data storage medium, and wherein the light source and the sensor unit are within a common housing.

TERMINOLOGY

The following terms are used in this application in accordance with their plain meanings, which are understood to be known to those of skill in the pertinent art(s). However, for the sake of further clarification in view of the subject matter of this application, the following explanations, elaborations and exemplifications are given as to how these terms may be used or applied herein. It is to be understood that the below explanations, elaborations and exemplifications are to be taken as exemplary or representative and are not be taken as exclusive or limiting. Rather, the terms discussed below are to be construed as broadly as possible, consistent with their ordinary meanings and the below discussion.

Video stitching—The term "video stitching" refers to the process of combining two or more video images with overlapping fields of view to produce a single video image having an effective field of view overlapping the fields of view of more than one of the source video images. This process preferably includes applying geometrical transformations (image warping) to at least partially correct for mismatches between the image data at or near the region of overlap due to camera optics and differences in viewing direction. The process may include storing and updating baseline image pixels for each video image, performing coordinate transforms on the pixels of each of individual video images based on baseline image pixels, determining the overlapping sections of the video images, performing warp correction to overlapping sections of video images, and filtering video images to enhance the final video image quality. Video stitching may be accomplished by algorithms in dedicated hardware, software, or a combination of both hardware and software. It should be noted that the term "stitching" as used herein refers to the implementation of the process that combines the images, and not necessarily to any process for determining what transformations are required. In cases where the video image sensors are in fixed positions, it is typically sufficient to determine once, or intermittently during a calibration process, what transformations are required to achieve effective video stitching. The calibration process may employ initial estimations based upon a priori data regarding camera positions and/or optical properties. Final determination of the required transformations and regions of overlap are typically achieved by image processing techniques, for example, employing feature-matching, as are well known in the art.

Stitched video image—The term "stitched video image" refers to a video image that results from a "video stitching" process as defined above.

The terms "image sensor", "video sensor" and "camera" are used herein interchangeably to refer to any and all image sensors which can sample a sequence of images to generate video output. The sensor may be a monochrome or color sensor, may be sensitive to visible and/or non-visible wavelengths of light, and may be multispectral. Furthermore, non-optical imaging sensor technology may be used such as, for example, microwave or other three-dimensional surface mapping technology, with the resulting data rendered into a sequence of images for display. A sensor according to any such technology is referred to herein generically as a "video sensor" generating "video data".

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a system and corresponding components for providing a virtual video patrol functionality.

The principles and operation of a system and corresponding components according to the present invention may be better understood with reference to the drawings and the accompanying description.

Figure 1:
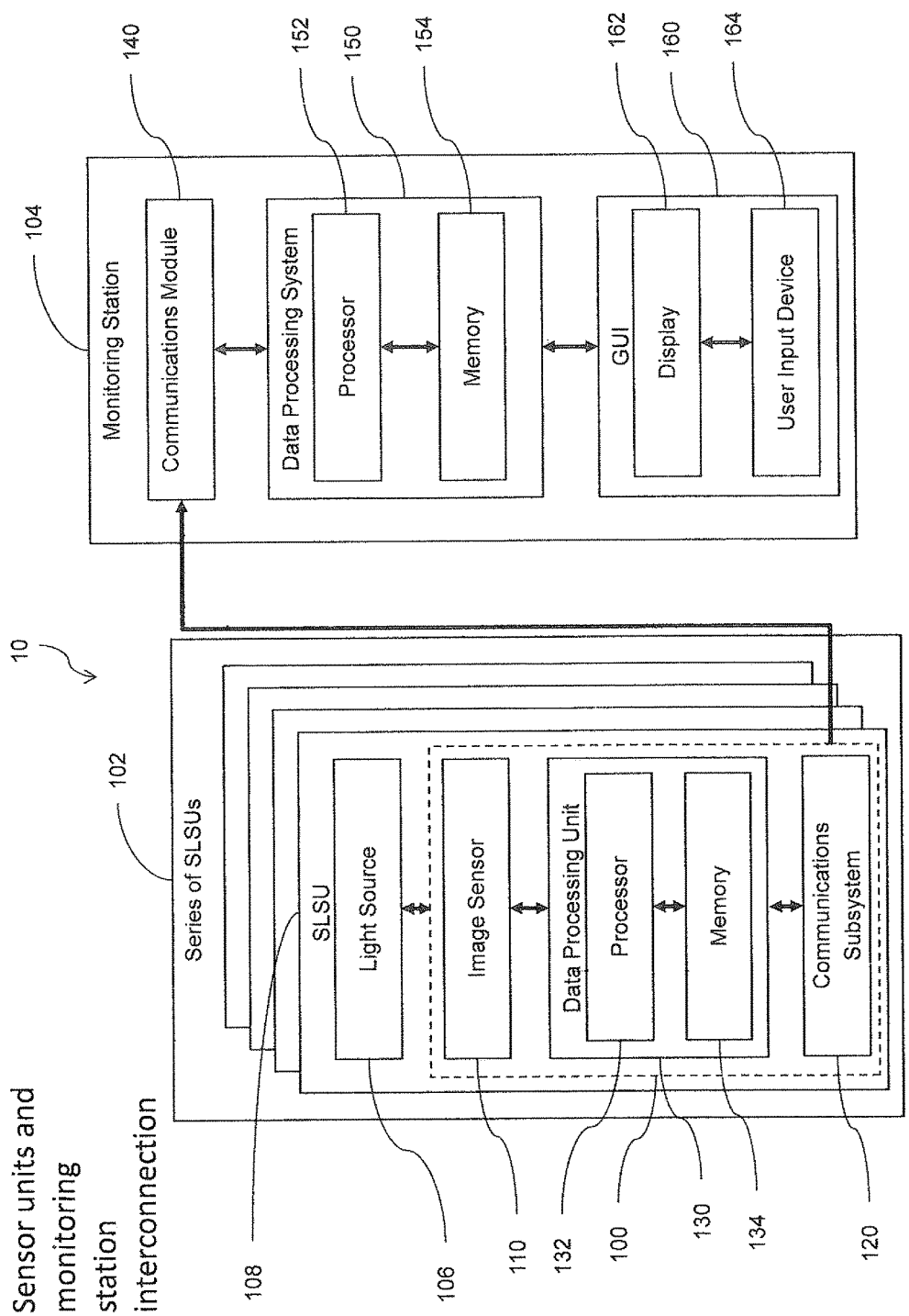
FIG. 1 illustrates a block diagram of a series of street light sensor units in communication with a monitoring station according to an embodiment of the invention.

Referring now to the drawings, FIG. 1 is an overall system block diagram of a system 10 and corresponding components for providing a virtual patrol functionality. With reference to FIG. 1, major elements of system 10 preferably include a plurality of street light sensor units (SLSUs) 102 and a monitoring station 104. Each individual SLSU 108 preferably includes a light source 106 for illuminating a region connected to a sensor unit 100. Each individual sensor unit 100 preferably includes an image sensor 110 for capturing video data from a field of view that overlaps at least partially with the region illuminated by the light source 106, a communications subsystem 120 for transmitting and receiving data, and a data processing unit 130 for processing video data as well as actuating the communications subsystem 120. Although preferably the light source 106 is physically connected to the sensor unit 100, the herein described embodiments, unless otherwise stated, are functional without a physically connected light source 106. Types of light sources include, but are not limited to, LED lights, incandescent light bulbs, halogen light bulbs, or other suitable sources that are capable of producing illumination. The data processing unit 130 preferably contains a processor 132 coupled to a storage medium such as a memory 134. The processor 132 can be any number of computer processors including, but not limited to a microprocessor, an ASIC, a DSP, a state machine, and a microcontroller. Such processors include, or may be in communication with computer readable media, which stores program code or instruction sets that, when executed by the processor, cause the processor to perform actions. Types of computer readable media include, but are not limited to, electronic, optical, magnetic, or other storage or transmission device capable of providing a processor with computer readable instructions. The communications subsystem 120 is configured to maintain a low bandwidth communication mode as actuated by the data processing unit 130. The low bandwidth communication mode configures the communications subsystem 120 to remain silent and not transmit video data until explicitly and individually requested to do so.

The SLSUs may be deployed in any suitable location, including, but not limited to, roads, highways, parking lots, public parks, and airports. Preferably, the SLSUs 102 are deployed such that physically adjacent sensor units have overlapping fields of view. The overlapping fields of view of physically adjacent sensor units provide continuous video coverage of a scene. Preferably, each individual SLSU 108 is in networked communication with the monitoring station 104, as depicted in FIG. 1. Major elements of the monitoring station 104 preferably include a communications module 140, a data processing system 150, and a graphical user interface 160. The communications module 140 is preferably configured such that it is in networked communication with the communications subsystems 120 of each SLSU 108. The data processing system 150 may contain a processor 152 coupled to a storage medium such as memory 154. Preferably, the graphical user interface 160 is connected to a user input device 164 as well as a display 162 for displaying data received from a SLSU. The types of data displayed on the display 162 may include, but is not limited to, video data, geographic information, SLSU information, and satellite maps or other maps with sensor geographic positions. A specific example may be a satellite map on the display 162 combined with the geographic location of a particular SLSU from the series of SLSUs 102. The geographic location of the particular SLSU may be represented by colored dot overlaid on the satellite map. The user input device 164 may be any suitable device for providing input, including, but not limited to, a keyboard, mouse, joystick, or a voice recognition system. The processor 152 can be any number of computer processors including, but not limited to a microprocessor, an ASIC, a DSP, a state machine, and a microcontroller. Such processors include, or may be in communication with computer readable media, which stores program code or instruction sets that, when executed by the processor, cause the processor to perform actions. Types of computer readable media include, but are not limited to, electronic, optical, magnetic, or other storage or transmission device capable of providing a processor with computer readable instructions. The communication may include, but is not limited to direct networked communication, communication via an intermediate cloud server, or other suitable paradigms.

Figures 2A, 2B:
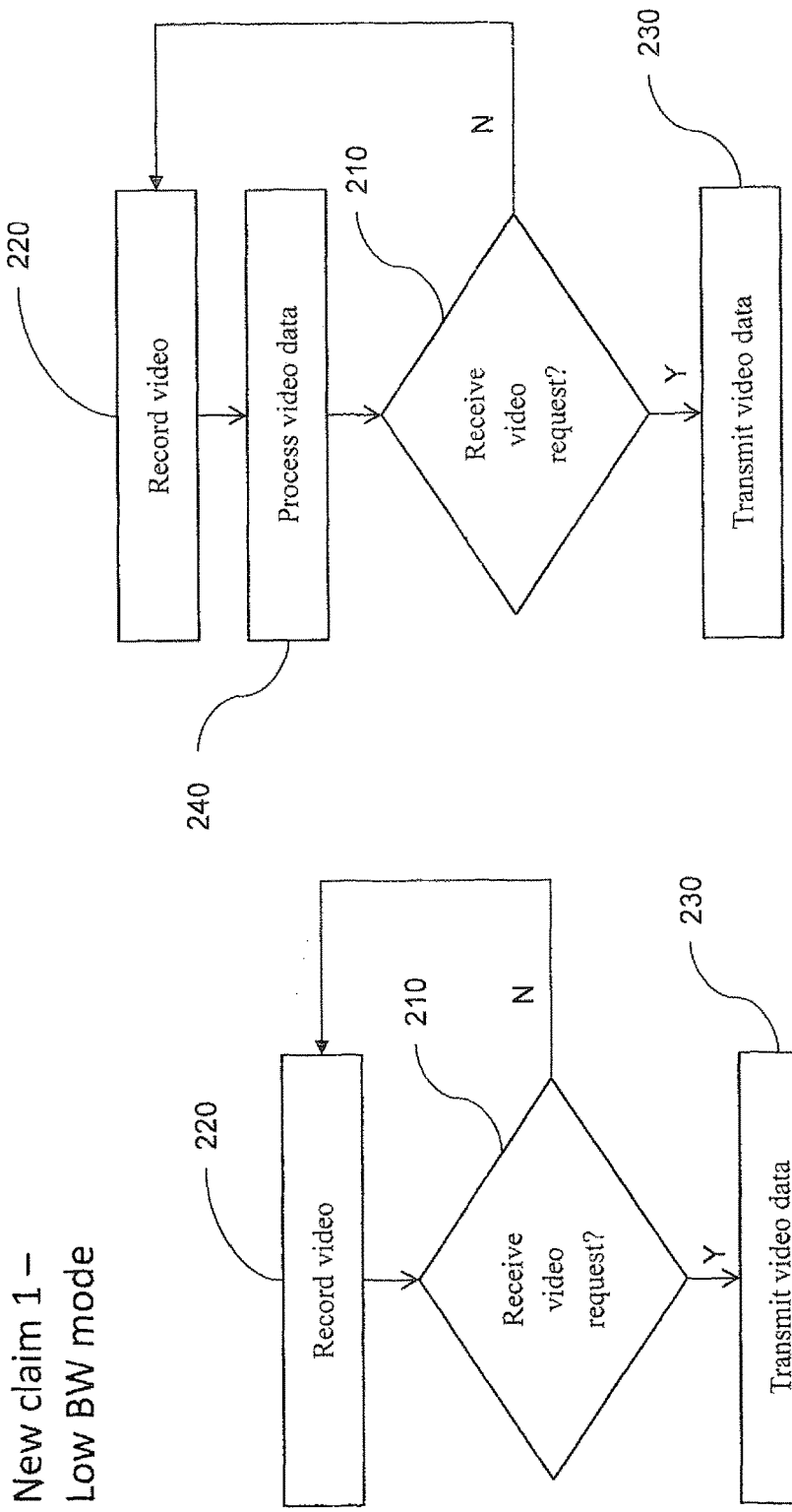
FIGS. 2A-2B illustrate a process for capturing and transmitting video data according to an embodiment of the invention.

Referring to FIG. 2A-B, examples of the processing flow of the low bandwidth communication mode are depicted by way of illustration purposes. In FIG. 2A, the communications subsystem 120 of FIG. 1 listens for incoming video data requests 210 from the monitoring station 104 or other systems in networked communication with the communications subsystem 120. Subsequent to a video data request 210, the real-time video data stream captured 220 by the image sensor is transmitted to the destination address of the device which sent the video data request 210, preferably to the monitoring station 104. In FIG. 2B, the data processing unit 130 of FIG. 1 may additionally process 240 the video data captured 220 from the image sensor 110 of FIG. 1 prior to transmission 230. The processing may include, but is not limited to, compression, sampling, trimming, filtering, warping, and/or any other suitable processing request. Although not depicted in the figures, indirect communication between the communications module 140 and the communications subsystems 120 of each SLSU 108 is also possible. For example, high bandwidth data from a SLSU 108 may be transmitted to the monitoring station 104 via a cloud server. In this example, high bandwidth data from a SLSU 108 may be first uploaded to a cloud server and subsequently downloaded by the monitoring station 104 for processing. Other suitable communication paradigms are also possible.

Figure 3:
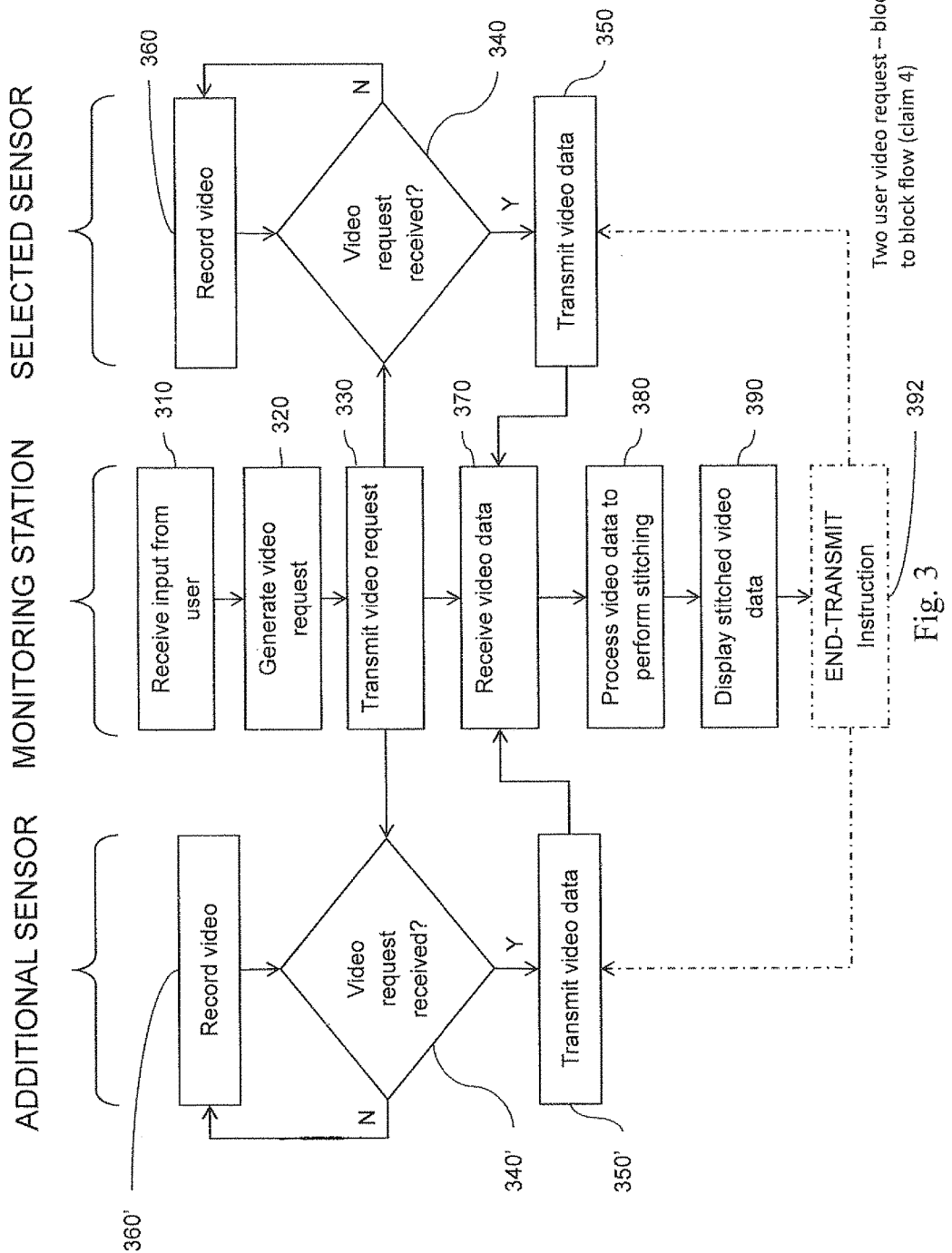
FIG. 3 illustrates a process for requesting, receiving, and stitching together video data streams according to an embodiment of the invention.

Referring to FIG. 1 and FIG. 3, a specific example of the processing flow of two SLSUs with overlapping fields of view is depicted for illustration purposes. Preferably, the user input device 164 is configured to receive input 310 from a user to generate 320 and send a video request 330 to a specifically selected SLSU. The video request 330 is sent to the communications module 140 via the data processing system 150. The communications subsystem 120 of the selected SLSU receives the video request 340 from the communications module 140. Preferably, the monitoring station 104 will also send a video request 340' to an additional SLSU that has an overlapping field of view with the selected sensor. In practice, a single SLSU may have overlapping fields of view with multiple distinct SLSUs; however FIG. 3 represents a specific example of two SLSUs with overlapping fields of view. Subsequent to receiving the video transmission request, the selected SLSU and the additional SLSU, may transmit 350, 350' recorded full quality video data 360, 360' to the monitoring station for processing. Upon receiving the video data 370 from each of the requested SLSUs, the data processing system 150 performs a video stitching algorithm 380 which may provide a single stitched video image. At least part of the stitched video image corresponding to the currently desired field of view is displayed 390 via the display 162 of the graphical user interface 160. The data processing system 150 may automatically send an END-TRANSMIT instruction 392 to a SLSU upon the condition that video data from that unit is no longer necessary for providing a single stitched video image. Upon receiving an END-TRANSMIT instruction 392, a SLSU will end video transmission. The user input device 164 may also be further configured to initiate sending of an END-TRANSMIT instruction 392 to a SLSU.

The data processing system of each SLSU may also perform processing on the video data prior to transmission. Processing may include, but is not limited to, compression, sampling, trimming, filtering, warping, and/or any other suitable processing requested by the monitoring station 104. Upon receipt of the processed video data by the monitoring station 104, the data processing system 150 may perform processing techniques which restore the received video data to full content, and subsequently may perform a video stitching algorithm which may provide a single stitched video image.

Figure 4:
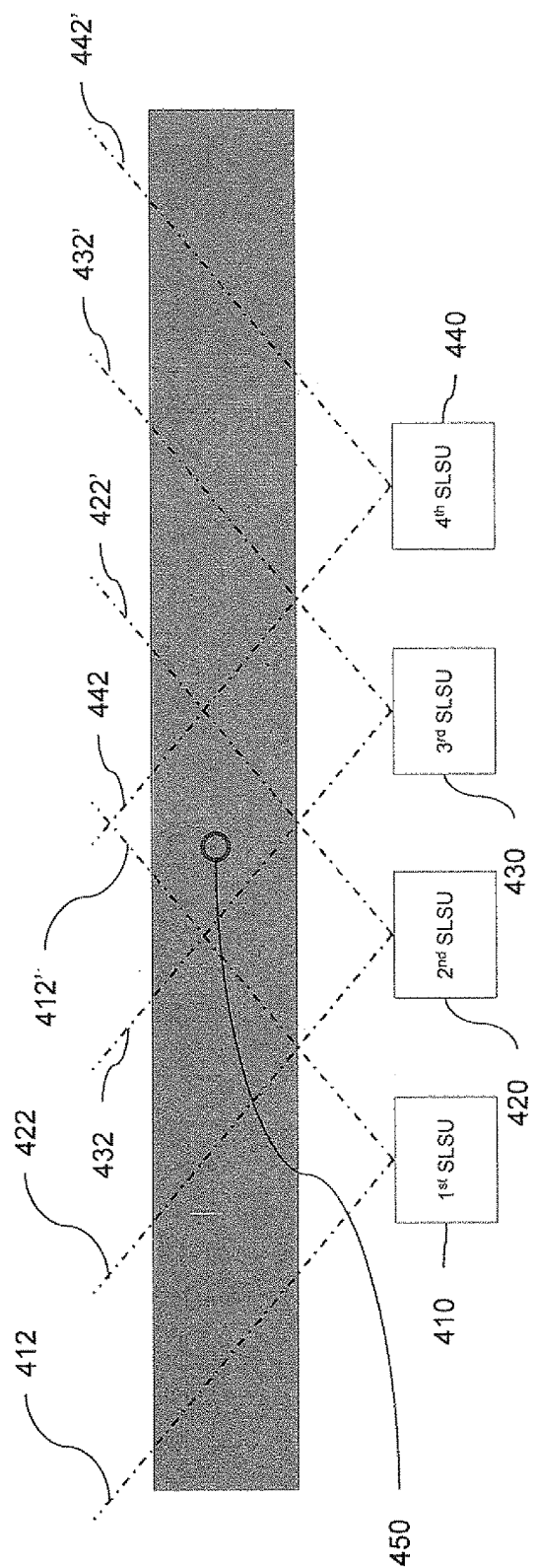
FIG. 4 illustrates a deployment of street light sensor units in an elongated array.

According to certain preferred embodiments, a plurality of SLSUs 102 in combination with a monitoring station 104 are deployed as described in FIG. 1. The SLSUs 102 are preferably deployed in spaced relation such that physically adjacent SLSUs have overlapping fields of view. This overlap enables the particular "virtual patrol" functionality, as will be described in more detail below. Many spatial arrangements are possible, including, but not limited to, SLSUs deployed in an elongated array, SLSUs deployed in a circular or oblong arrangement, SLSUs deployed in a triangular arrangement, SLSUs deployed in a polygonal arrangement, and SLSUs deployed at different heights. Referring to FIG. 4, an example of a series of four SLSUs deployed in an elongated array is presented for illustration purposes. As mentioned, the SLSUs are arranged such that the field of view of each SLSU overlaps with the field of view of physically adjacent SLSUs. The first SLSU 410 has a field of view that is contained within the space between a first set of field of view boundary edges 412, 412'. The second SLSU 420 has a field of view that is contained within the space between a second set of field of view boundary edges 422, 422'. The third SLSU 430 has a field of view that is contained within the space between a third set of field of view boundary edges 432, 432'. The fourth SLSU 440 has a field of view that is contained within the space between a fourth set of field of view boundary edges 442,442'. The field of view of the first SLSU 410 overlaps with the field of view of the second SLSU 420. The field of view of the second SLSU 420 additionally overlaps with the field of view of the third SLSU 430. The field of view of the third SLSU 430 additionally overlaps with the field of view of the fourth SLSU 440. An object 450 is contained within the fields of view of the second SLSU 420 as well as the third SLSU 430.

It is a particularly preferred feature of certain embodiments of the present invention that the system and corresponding method provide a "virtual patrol" functionality. The term "virtual patrol" is used herein to describe a process of visually monitoring an extended area, as if progressing along a route, without the operator actually traveling. Practically, this is achieved by allowing virtual, panning within stitched video images derived from image sensors with overlapping fields of view, and dynamically switching the group of image sensors transmitting video data in order to allow dynamically changing coverage of the stitched video image as the instantaneous field of view progresses along an array of image sensors. It should be noted that an operator of the "virtual patrol" is not limited to smooth progressive movement along a route, and can typically jump to any particular location selected, for example, on a map. However, the ability to perform virtual panning in video images over an extended area provides an intuitive interface and greatly improves situational awareness compared to abrupt switching between difference camera views from differing viewpoints. An exemplary implementation of this feature will now be described.

Figure 5A:
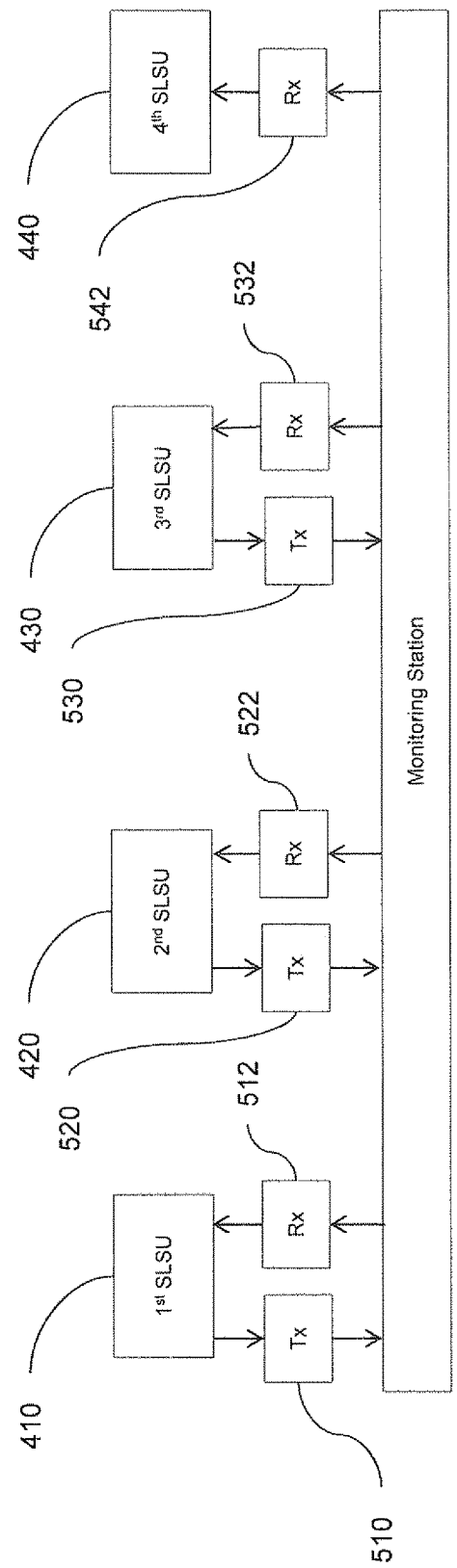
FIGS. 5A-5B and FIG. 6A-6C illustrate a process for a user to virtually pan through video data.
Figure 5B:
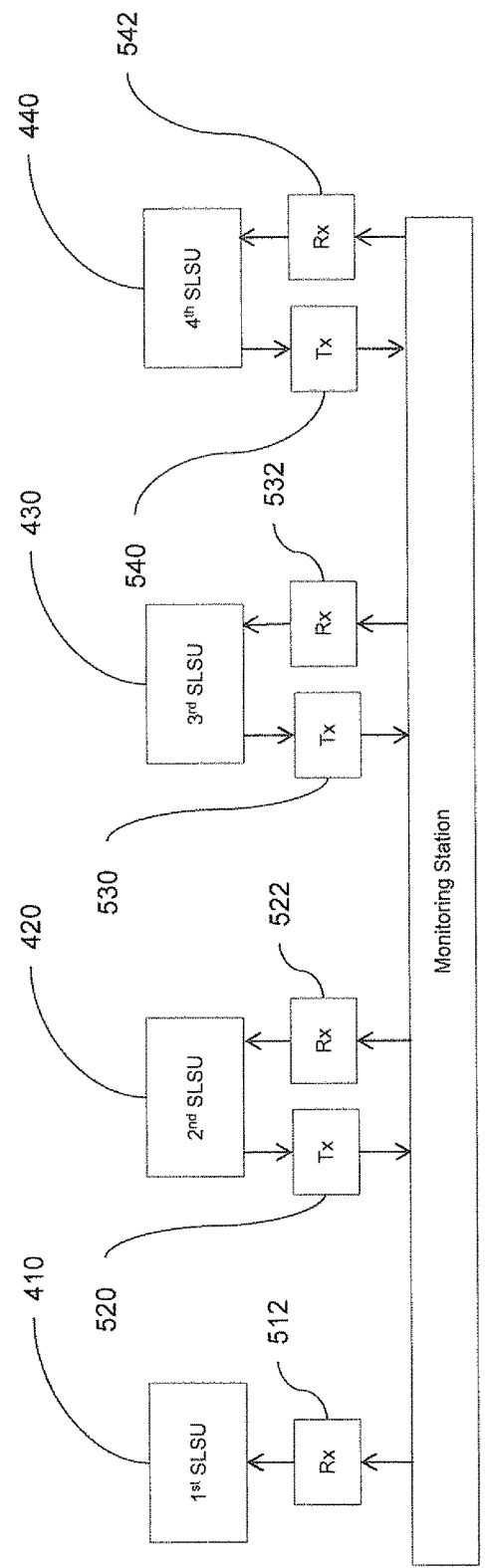
Figure 5C:
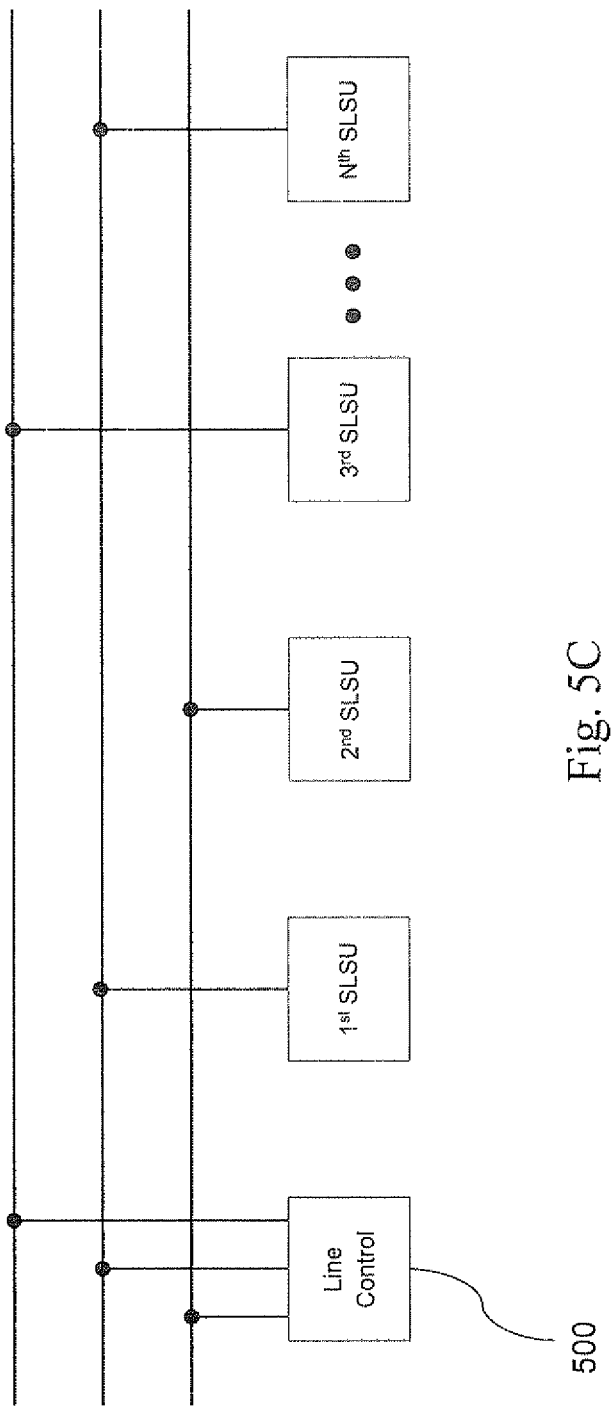
FIG. 5C illustrates street light sensor units configured to operate via power line communication with a three phase power supply.
Figure 6A:
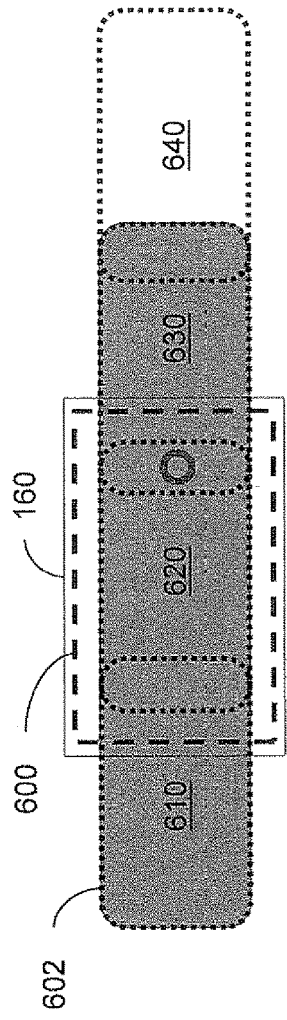
Figure 6B:
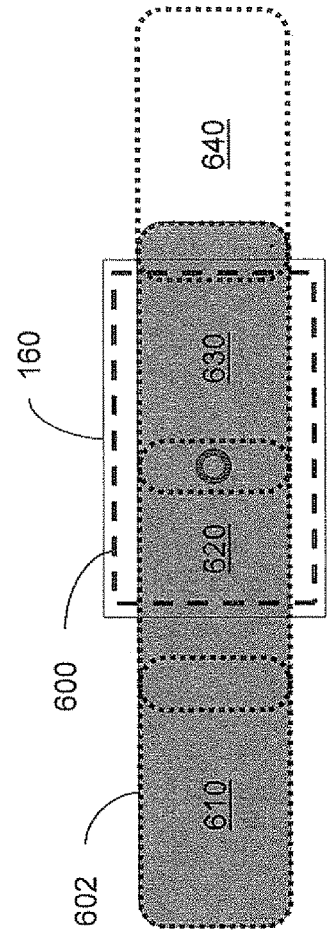
Figure 6C:
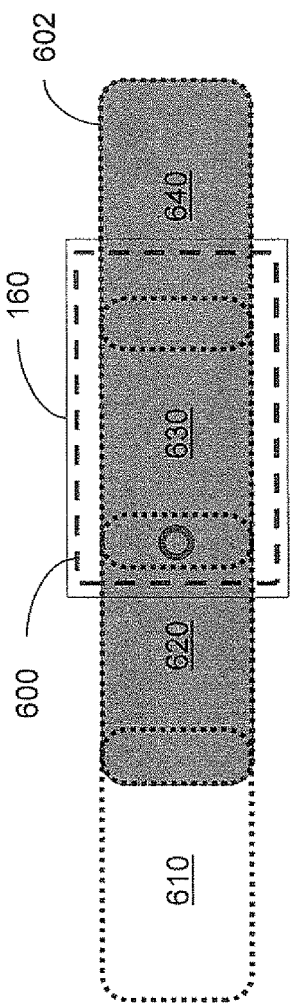

The transmit and receive processing flow may follow a similar flow to that illustrated in FIG. 3. The user input device 164 of FIG. 1 may be used to virtually pan through the stitched video image. Referring now to FIGS. 5-6C, the virtual pan capability is described by example. In this specific example, the elongated array configuration of FIG. 4 is used for illustration. The four image sensors illustrated here are typically at some arbitrary location along an extended array of image sensors, which may number many tens, or hundreds of sensors, or possibly thousands of image sensors in a case of city-wide coverage. Prior to any user request for video from a specific location, all of these many image sensors are preferably maintaining their low bandwidth mode. Upon receipt of a video request from an operator seeking to receive video images from a location corresponding to the second sensor 420, the monitoring station 104 of FIG. 4 transmits a video request to second sensor 420 and additional video requests to the first and third SLSUs 410, 430. FIG. 5A depicts the resulting transmit and receive configurations of the four SLSUs. The first three SLSUs 410, 420, 430 transmit video data 510, 520, 530 and are also configured to receive 512, 522, 532 command and control messages from the monitoring station. Referring to FIG. 6A, the current video image 600 is derived from a stitched video image 602 and displayed via the graphical user interface 160. Stitched video image 602 is stitched from video images 610, 620, 630 derived, respectively, from the first three SLSUs 410, 420, 430 that are transmitting video data 510, 520, 530 (FIG. 5A). The region 640, corresponding to the field of view of SLSU 440 is not available, since SLSU 440 remains in low-bandwidth mode (like other SLSUs in the system that are not shown), monitor for video data transmission requests 542. Referring to FIG. 6B, as the user operates input device 164 of FIG. 1 to request panning to the right, the portion of stitched image 602 provided as the current video image 600 pans across the stitched image. At the stage illustrated in FIG. 6B, data from image 610 is no longer required for generating the current image 600, and the system identifies that the requested field of view is moving towards the region covered by SLSU 440. Accordingly, the monitoring station transmits an END-TRANSMIT instruction to SLSU 410 and a transmit request to SLSU 440. After this switch-over, a new stitched video image 604 including regions 620, 630, 640 is generated, thus allowing continued virtual panning into the region corresponding to the field of view of SLSU 440, as illustrated in FIG. 6C. The updated transmit and receive configurations for the four SLSUs is depicted in FIG. 5B. This hand-over process can be performed repeatedly, allowing the operator to perform a continuous virtual panning motion along a region covered by an array of image sensors.

The same, or similar, techniques may be used to virtually pan in a multitude of directions. For example, where arrays of SLSUs cover multiple intersecting paths, such as in a system giving coverage of a system of roads, a suitable user input can be used to select which of a plurality of available paths should be selected for continued virtual panning through a junction.

It should be appreciated that the example of SLSUs transmitting in groups of three is a non-limiting example. In certain cases, particularly where the current video image corresponds to a smaller field of view than an individual camera, or where panning in steps is acceptable, it may be sufficient to have two SLSUs transmitting at a time. Similarly, where allowed for by the network bandwidth, it may be preferable to have more than three units transmitting at a time, for example, four units, which allows the upcoming unit to be actuated before another unit is stopped, or five units including two on either side of the current viewing location.

In one particularly preferred implementation in which power-line communications are used, the use of three SLSUs transmitting at one time may offer a particular synergy with power line communications where a three-phase electrical power supply is available. Specifically, by linking successive SLSUs cyclically to the three phases, the system can ensure that only one video data transmission needs to be transferred on each phase at any given time, thereby simplifying encoding requirements and/or avoiding bandwidth limitations which might otherwise be encountered. More generally, however, the PLC protocol used has sufficient bandwidth to carry more than one video transmission in parallel, and connections to the different phases of the electrical supply occurs in an arbitrary manner according to the existing power supply architecture of the streetlight grid. A line control unit 500, in direct or indirect data communication with the monitoring station 104, is connected to all three phases and relays data to and from each of the phases, rendering the entire system phase-independent. An example of the above described implementation is shown in FIG. 5C. Although the SLSUs preferably maintain the low-bandwidth mode indefinitely until video data is requested, the SLSUs preferably perform continuous recording and processing of video data from their respective fields of view. The recorded data serves as an archive which can be called up from the monitoring station for viewing later, and provides a basis for monitoring for a range of different conditions under which an alarm signal or other prompt may be sent to the monitoring station. Various examples of this functionality will now be described.

According to certain preferred embodiments, the data processing unit 130 of each SLSU 108 is configured to perform video processing algorithms or techniques on video data captured by the SLSU image sensor 110 in order to generate and transmit an alert to the monitoring station 104 or other systems in networked communication with the communications subsystem 120. Types of video processing algorithms and supplementary processing techniques may include, but are not limited to, pattern/object recognition algorithms, object tracking algorithms, anomaly detection algorithms, machine learning algorithms (supervised or unsupervised), and hypothesis tests, as well as combinations of the above. Preferably, upon installation of a SLSU 108, there is an initial calibration or learning period, during which the SLSU may capture and processes video data in the field of view in order to define a nominal baseline. An example of a nominal baseline may be a time-averaged or modal value of each pixel, corresponding to a static background image. The baseline definition preferably also includes information, either preset during installation or derived during the learning period, defining the type of activities considered "normal" within the field of view of the unit and/or what criteria are to be used to identify abnormal situations which should generate an alarm or other notification. Preferably, the alarm signal conditions are predicated on predefined rules or rules established during a learning period, characterized by the movement of objects in a monitoring region. The movement of objects which violates any or all of the rules may generate an alarm. The rules may depend on the specific scene which the field of view is monitoring. Preferably, the nominal baseline is stored in a suitable format in the memory 134 associated with the data processing unit 130. Preferably, subsequent to the learning period, video data captured by the image sensor 110 is sent to the data processing unit 130 for analytical comparison with the nominal baseline stored in the memory 134 using any suitable technique. The analytical comparison will preferably generate a score for the video data streams according to a metric relating to each of the potential alarm criteria defined in force for the given SLSU. Preferably, video data streams which score above a given statistically significant threshold defined for each alarm condition metric will generate a corresponding event alert signal.

Events may be defined depending on the specific scene which the field of view is monitoring. For example, if the field of view is observing a highway, the nominal baseline activity constitutes motor vehicles traveling at a predetermined minimum speed. The categorization of expected content included within the SLSU field of view may be defined by an operator, or may be automatically derived during a learning period or recalibration period. In the example of a SLSU monitoring a region of a highway, types of events which may satisfy an alert criterion may include, but are not limited to, a motor vehicle stopped on the highway, a collision of motor vehicles, a pedestrian moving on the highway, a pedestrian motionless on the highway, or an object obstructing one or more lanes of the highway.

The above example of monitoring a region of a highway is only one of a wide range of categories which may be assigned to SLSUs across a system. Other examples include, but are not limited to:

SLSUs monitoring road junctions and other no-parking zones, where motion interruption for a period of time may be normal, but where an obstruction in the road for more than a certain period of time may generate an alarm signal;

SLSUs monitoring pedestrian-only regions, where the presence of an object classified as a motor vehicle may generate an alarm signal;

restricted areas where access is denied for security or safety reasons, where the presence of any people or vehicles may generate an alarm signal.

It will be appreciated that the above are a limited set of examples, and the system of the invention can readily be adapted to evaluate and identify a wide range of additional or alternative alarm signal criteria appropriate to various situations and applications of the technology.

Figure 7:
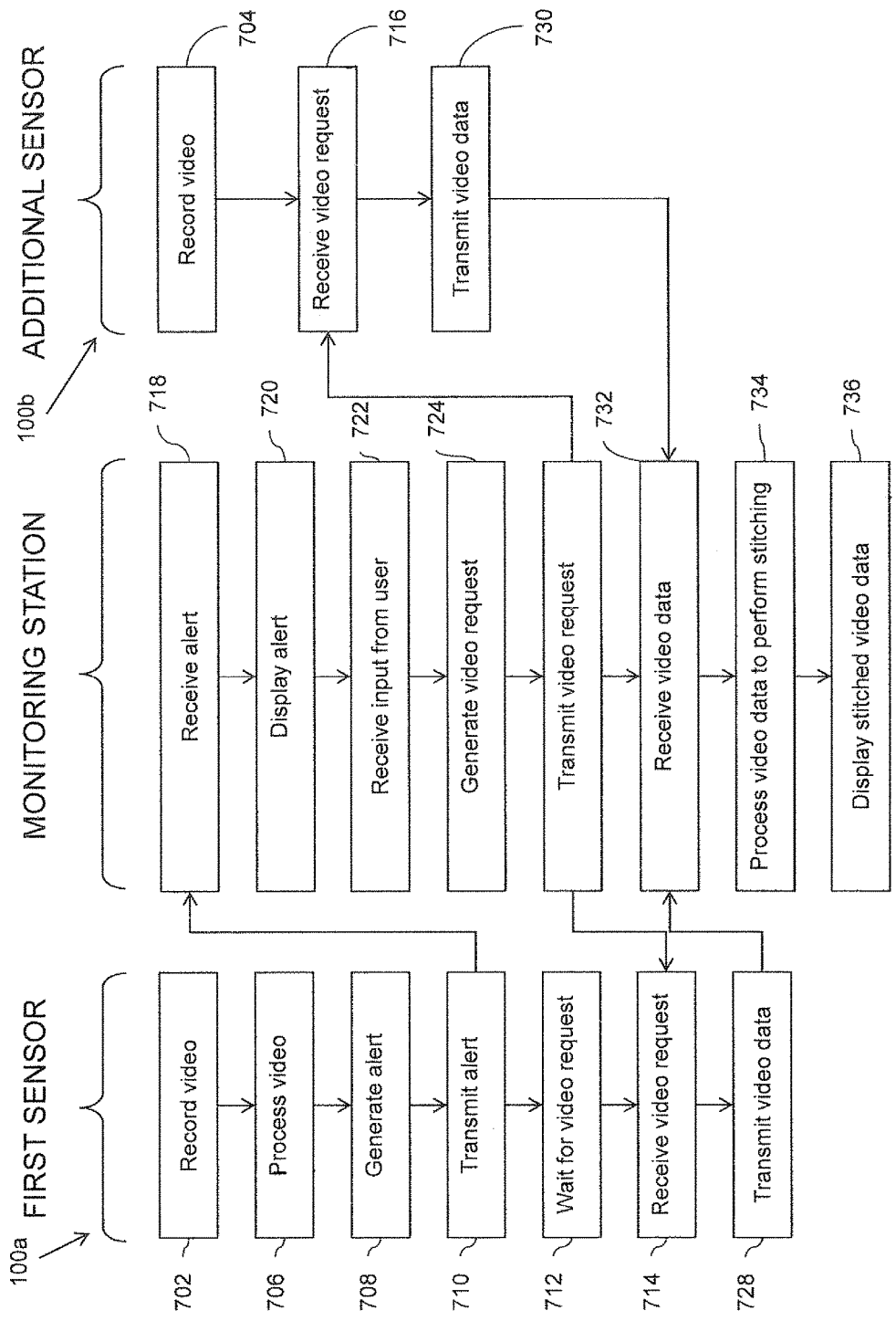
FIG. 7 illustrates a process for generating and sending alert notifications, followed by requesting, receiving, and stitching together video data streams according to an embodiment of the invention.

The capability of individual SLSUs to identify alarm conditions and generate an alarm signal, while remaining in low bandwidth mode, facilitates additional layers of functionality beyond what was described above with reference to FIG. 3. Referring to FIG. 1 and FIG. 7, a specific example of a first SLSU 108a and an additional SLSU 108b with overlapping fields of view is depicted for illustration purposes. Two SLSUs 108a, 108b record 702, 704 video data captured from respective image sensors. The first SLSU 108a processes 706 video data captured 702 from its image sensor. The data processing unit of the first sensor 108a generates an alert 708 and actuates the communications subsystem to transmit 710 the generated alert to the monitoring station 104. Subsequent to the alert transmission, the communications subsystem of the first sensor waits for a video request 712 from the monitoring station 104, maintaining the low bandwidth mode of communication. The remaining processing steps are parallel to those described above with reference to FIG. 3. Specifically, upon receiving 718 the alert, the monitoring station 104 may display 720 a map with the geographic location of the SLSU 108a that issued the alert. A user input device 164, including, but not limited to a mouse, keyboard, joystick, touch-screen input or voice recognition system, is used to interactively select 722 the SLSU 108a that issued the alert. Upon selection of the SLSU 1082, the data processing system 150 may generate a video request 724 addressed to the selected SLSU 108a and to additional SLSUs 108b which have fields of view that overlap the field of view associated with the selected SLSU 108a. The video requests 724 are transmitted 726 to the specified SLSUs 108a,108b. Upon receiving the video requests 714,716 each specified SLSU 108a,108b transmits video data 728,730 to the monitoring station 104. The monitoring station 104 receives 732 and processes 734 the different video data feeds in order to produce the stitched video image discussed in previous embodiments. The stitched video image is displayed 736 via the graphical user interface 160. The user input device 164 may subsequently be used to perform the virtual panning action as described in previous embodiments. Additionally, the data processing system of each SLSU may also perform processing on the video data prior to transmission. Processing may include, but is not limited to, compression, sampling, trimming, filtering, or any other suitable processing requested by the monitoring station 104. Upon receipt of the processed video data by the monitoring station 104, the data processing system 150 may perform processing techniques which restore the received video data to full content, and subsequently may perform a video stitching algorithm which may provide a single stitched video image.

While the present invention can clearly be implemented using a dedicated infrastructure where feasible, it is a particularly preferred feature of certain implementations of the invention that it lends itself easily to installation based primarily, if not exclusively, on commonplace existing infrastructure. By way of one particularly preferred example, the SLSUs of the present invention can advantageously be implemented for installation in conventional streetlight poles, which typically provide vantage points spaced at roughly regular intervals along roads in combination with an electrical power supply provided along power lines which can also be used for power-line communication. In this particularly preferred embodiment, the light source 106 and sensor unit 100 of FIG. 1 are preferably contained within a common housing and are preferably fed by a single connection to the electrical power supply, to facilitate faster and easier installation on existing infrastructure. When combined with energy efficient high-output LED street lighting as a replacement street light fitting, installation of SLSUs according to the present invention becomes a particularly cost-effective proposition for upgrading conventional street lights over an extended region.

Figure 10:
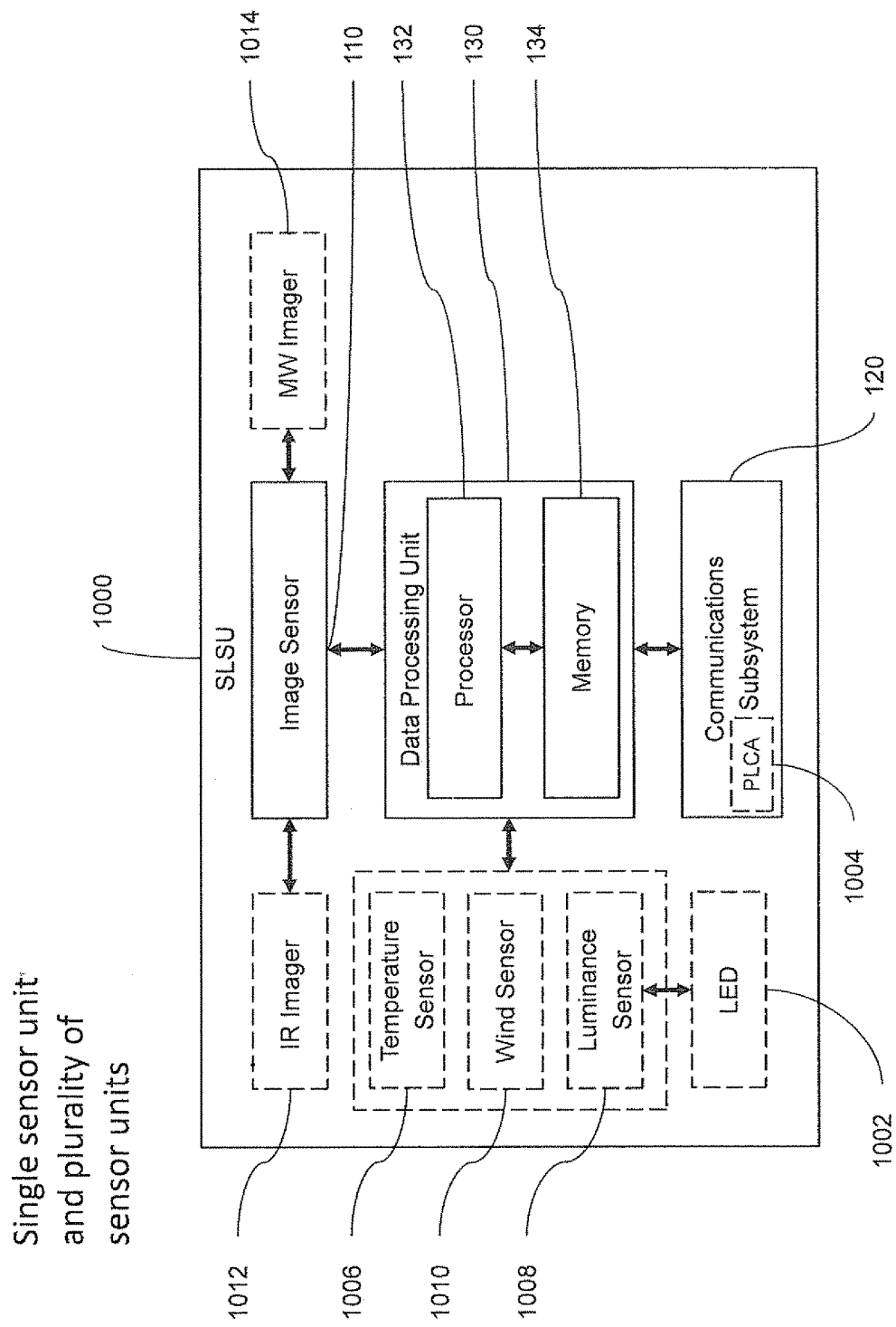
FIG. 10 illustrates a block diagram of a street light sensor unit with multiple accessory features.

An example of such an implementation is illustrated in FIG. 10, which is an overall system block diagram showing an embodiment of a representative SLSU 1000 with multiple sensors 1006, 1008, 1010, an LED lighting unit 1002, a PLC adapter 1004, an infrared (IR) imaging device 1012 for capturing video data in environments lacking in visible light, and a microwave (MW) imaging device 1014 for capturing the movement of objects in environments where the visibility of the objects in obstructed by edifices or the like.

It should be noted that the SLSU 1000 can be used as a "smart street light" platform for providing a wide range of other functions, including various data collection, data output and communications functions. For example, additional sensors that may be integrated with a SLSU 1000, include, but not limited to, temperature sensors 1006 for collecting temperature data, luminance sensors 1008 for detecting ambient light, and wind sensors 1010 for detecting wind velocity. SLSU 1000 may also include communication components for implementing daisy-chained WIFI access points and/or include cellular repeater stations and/or other hardware solutions for providing communications access to nearby or passing users. Local image processing may also automatically derive traffic congestion information, which may be shared via the communications network while remaining in low bandwidth mode. The multiple sensors 1006, 1008, 1010 in combination with the monitoring station 104 of FIG. 4 are preferably used to intelligently control the illumination level of each SLSU LED lighting unit 1002. For example, in the event that the luminance sensor 1008 detects sufficient natural lighting, the LED lighting unit 1002 is preferably turned off or dimmed. Another example is a SLSU which has been deployed in an isolated area. At night, when the luminance sensor 1008 detects no sunlight or other sources of visible light, it may seem logical that the LED lighting unit 1002 operate at a high illumination level to provide visibility for vehicles and other passersby. However, traffic information coupled with data collected from other sensors in the SLSU as well as other. SLSUs, may be indicative of conditions for which minimal or no lighting is necessary. Such conditions may include, but are not limited to, no passing vehicle traffic and no passing pedestrian traffic within a defined distance, or travel time, from the SLSU. In such conditions, the LED lighting unit 1002 is preferably dimmed to a reduced illumination level.

According to certain preferred embodiments, communication between the monitoring station 104 and SLSUs 102 is via a wireless network, including, but not limited to, GSM, CDMA, 4G, LTE, Wi-Fi, or WiMax. Different communications protocols may be used for the transmission and reception of different types of data. For example, alerts or video requests are preferably transmitted and received by using Power Line Communication technology, while video data is preferably transmitted and received by using a cellular broadband protocol such as LTE.

According to certain preferred embodiments, both the monitoring station 104 and SLSUs 102 are equipped with audio sensors and speaker systems. Types of audio sensors may include, but are not limited to, microphones, Doppler sensors, or any other suitable device for capturing and/or measuring audio. Voice communications is established via any of the wired or wireless network protocols discussed in previous embodiments. Voice communication modes may be any suitable mode of communication, including, but not limited to, point-to-point, point-to-multipoint, half-duplex, and full-duplex. The monitoring station 104 is preferably configured to request audio data from a selectively specified SLSU 108. The process of the monitoring station requesting and receiving audio data, and a SLSU receiving an audio request and transmitting audio data, is logically similar to the video data request process described in FIG. 2A and FIG. 3. Additionally, or alternatively, emergency responder intercom contact may be initiated by a passerby at the SLSU by actuating an emergency call button or the like associated with the SLSU. This would preferably also generate a prioritized alarm signal to the operator of the monitoring system to prompt the operator to view the corresponding region and initiate appropriate action to address any emergency that may have occurred.

Figure 8:
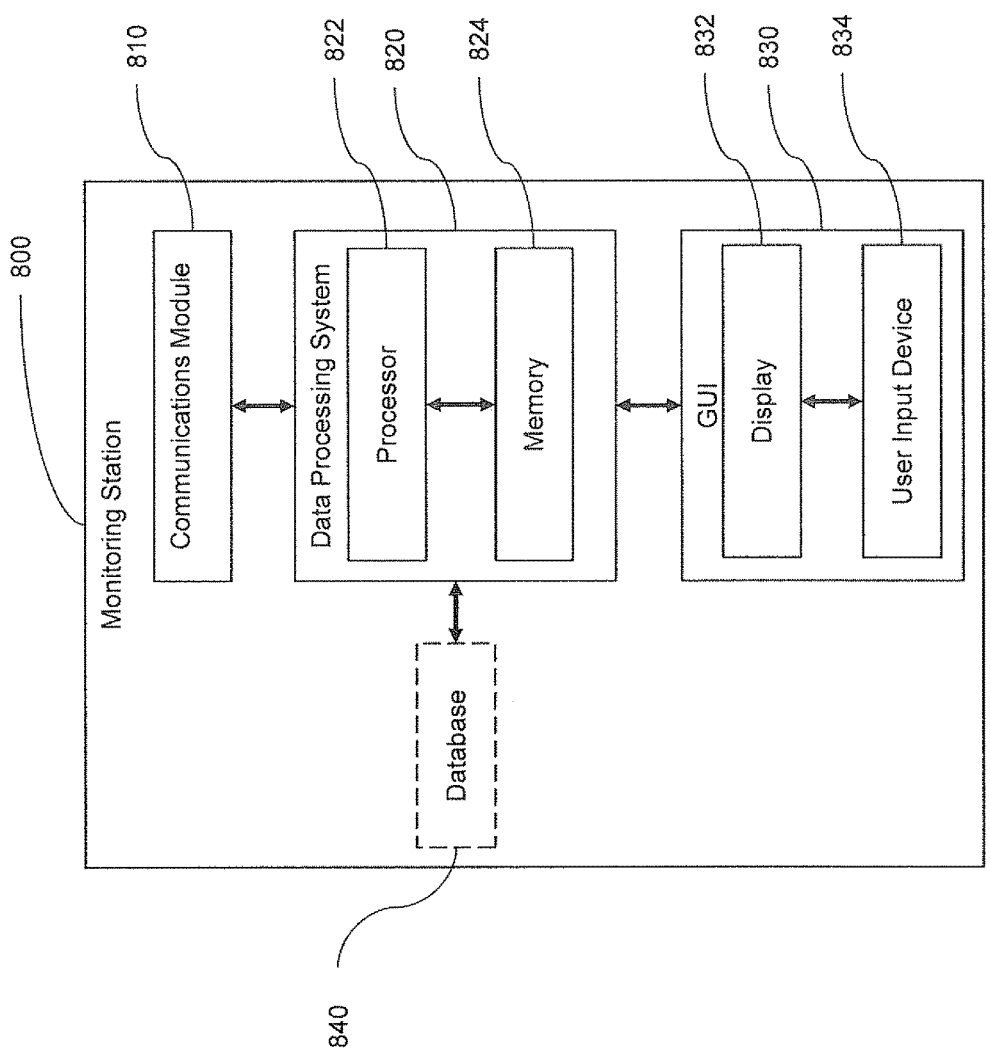
FIG. 8 illustrates a block diagram of a monitoring station according to an embodiment of the invention.

According to a preferred embodiment, the monitoring station of FIG. 1 is deployed remotely from the SLSUs 102. FIG. 8 depicts the monitoring station of FIG. 1 and additional database component 840. The user input device 834 is preferably configured to receive input from a user to generate and send a video request to a specifically addressed device that is in communication with the communications module 810. Additional video requests are preferably sent to the address of a device, or devices, that are physically adjacent to the specifically addressed device. A mapping which relates the physical location of devices to the network address of devices is preferably stored in any suitable location, including, but not limited to, the memory 824 of the monitoring station 800, the cloud, or as illustrated in FIG. 8, a database or table 840 which is preferably associated with the data processing system 820.

Figures 9A, 9B:
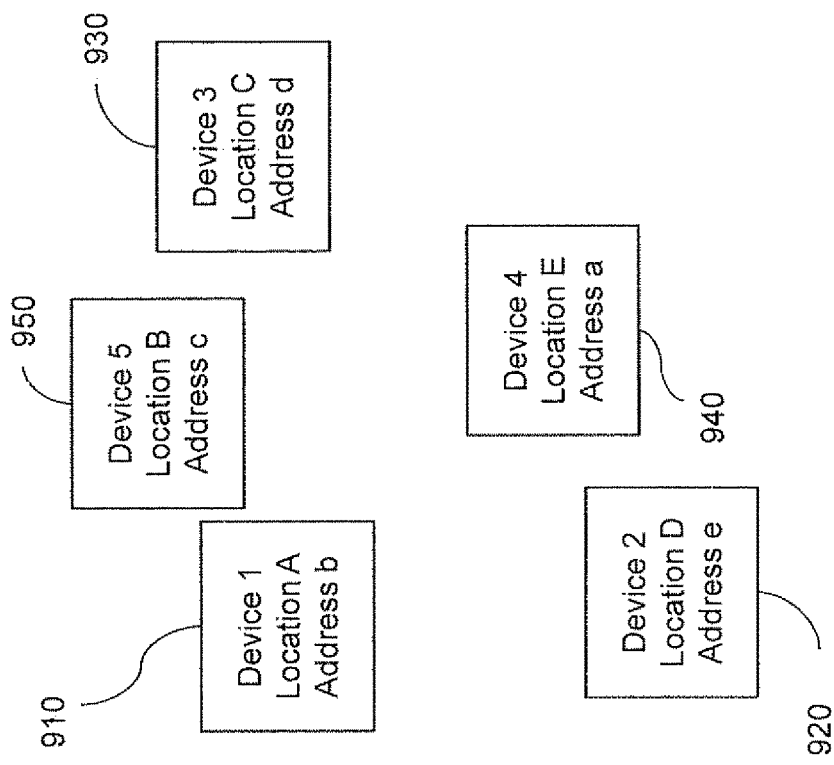
FIGS. 9A-9B illustrate an example of device physical locations and network addresses.

Referring now to FIGS. 9A-9B, an example of five devices in physical space and the database 840 which associates the physical location of each device with a network address is illustrated. In this example, if a video request is addressed to Device 4 940 in Location E, a video request may also be sent to the device, or devices, closest in physically proximity, which in this case is Device 2 920, in location D. The example database entry in FIG. 9B shows the mapping of device location and network address. In this case, the devices to be addressed have addresses a 942 and e 922. Any change to the number of devices is preferably reflected in an update to the mapping.

Although the operation of the system as described thus far has related primarily to viewing and "patrolling" real-time video data, certain particularly preferred implementations of the invention allow the operator to view data previously stored in one or more of the SLSUs, and most preferably, to perform virtual panning ("patrolling") within that historical data as if viewing it in real-time. For this purpose, the video requests preferably include a timestamp flag which will either correspond to the date and time of the video being requested or will flag the video request as a real-time video request for the video currently being sampled. In the case of historical video, any subsequent instructions for a new given SLSU to start transmitting will also include a corresponding timestamp in order for the newly added video data for stitching to be synchronized with the currently transmitted data from the actively transmitting SLSUs.

One common application of this historical video retrieval occurs in the case of an alarm signal generated at a certain SLSU, where the operator wishes to evaluate the events directly. The operator is preferably given an option to trigger viewing of the video starting immediately before the video sequence which caused generation of an alarm signal, thereby providing the exact information needed for rapid and reliable assessment of the validity and seriousness of the alarm.

Although the system as described thus far has pertained to a SLSU 108 comprised of a street light 106 connected to a sensor unit 100 as described in FIG. 1, other embodiments are possible in which a plurality of sensor units 100 are deployed in spaced relation without any lighting sources. These sensor units 100 may be deployed in conjunction with a monitoring station 104 as described above, with the operation of the system primarily for viewing and "patrolling" real-time video data, as well as "patrolling" historical video.

It will be appreciated that the above descriptions are intended only to serve as examples, and that many other embodiments are possible within the scope of the present invention as defined in the appended claims.

What is claimed is:

1. A system comprising:
an array of street light and sensor units, each of said street light and sensor units comprising:
a light source deployed for illuminating a first region,
an image sensor for capturing video data from a field of view having at least partial overlap with said first region,
a communications subsystem configured for transmitting and receiving data over a wired or wireless network, said communications subsystem having an associated identifier, and
a data processing unit associated with said image sensor and said communications subsystem comprising at least one processor and a data storage medium, wherein said data processing unit is configured to actuate said communications subsystem to:
maintain indefinitely a first mode in which no video data is transmitted and said communications subsystem monitors for video data requests, and
selectively on receipt of a video data request relating to said associated identifier, transmit video data derived from said image sensor; and a monitoring station comprising:
- a communications module in networked communication with said communications subsystems,
- a data processing system comprising at least one processor and a data storage medium, said data processing system being associated with said communications module, and
- a graphical user interface associated with said data processing system, said graphical user interface including a display and at least one user input device, wherein said array of street light and sensor units are deployed in spaced relation such that said fields of view provide continuous coverage of a scene, and wherein said monitoring station is responsive to an input via said at least one user input device to transmit a video request addressed to a first of said street light and sensor units and a second of said street light and sensor units having an overlapping field of view with said first of said street light and sensor units, and wherein said communications module is configured to receive video data associated with said video request to said first street light and sensor unit and to said second street light and sensor unit over said wired or wireless network, and wherein said data processing system is configured to generate from said video data a stitched video image, said stitched video image having an effective field of view overlapping the fields of view of said first and second of said street light and sensor units, and wherein said monitoring station is configured to display via said graphical user interface a subregion of said effective field of view, said monitoring station further being responsive to an input via said at least one user input device to pan said subregion within said effective field of view of said stitched video image, and wherein said monitoring station is configured such that, prior to said subregion reaching a boundary of said effective field of view, said monitoring system transmits a video request addressed to a third of said street light and sensor units having an overlapping field of view with one of said first and second said street light and sensor units, and wherein said data processing system is configured to generate from said video data a stitched video image having an effective field of view extending beyond said boundary.

2. The system of claim 1, wherein each said data processing unit is further configured to:
- process said video data from said image sensor to monitor for events occurring within said field of view; and
- on identifying an event occurring within said field of view that satisfies at least one alert criterion, actuate said communications subsystem to transmit an alert notification via a respective phase of a three-phase electric power supply while maintaining said first mode.

3. The system of claim 1, wherein said communications module is further configured to receive alert notifications from physical locations over an electric power line, and wherein said graphical user interface is configured to generate a display indicative of said physical locations from which said alert notifications have been received.

4. The system of claim 1, wherein each of said street light and sensor units is further configured to perform processing to track moving objects; and wherein said at least one alert criterion includes the movement of objects which violates at least one predefined rule.

5. The system of claim 1, wherein each said image sensor is configured to capture video data from said field of view via infrared imaging.

6. The system of claim 1, wherein each said image sensor is configured to capture video data from said field of view via microwave imaging.

7. The system of claim 1, wherein each said street light and sensor unit further comprises an audio sensor for capturing audio data.

8. The system of claim 7, wherein said monitoring station is responsive to an input via said at least one user input device to transmit an audio request addressed to a selected one of said street light and sensor units, and wherein each of said street light and sensor units is responsive to a correspondingly addressed audio request to transmit audio data to said monitoring station.

9. The system of claim 7, wherein each said street light and sensor unit further comprises a speaker system configured to play audio data.

10. The system of claim 9, wherein said monitoring station further comprises:
- an audio sensor for capturing audio data; and
- a speaker system configured to play audio data.

11. The system of claim 1, wherein said array of street light and sensor units includes tens of street light and sensor units, and wherein a minority subset of said plurality of street light and sensor units simultaneously transmit video data.

12. The system of claim 1, wherein said communications subsystem of said first street light and sensor unit is configured to transmit the derived video data via a first phase of a three-phase electric power supply, and wherein said communications subsystem of said second street light and sensor unit is configured to transmit the derived video data via a second phase of the three-phase electric power supply.

13. The system of claim 1, wherein each of said communications subsystems is configured to transmit, when in said first mode, over an electric power line, and when transmitting video data derived from said image sensor, to transmit said video data over a wired or wireless network, said wired or wireless network being separate from said electric power line, and wherein said wired or wireless network is a broadband network.

* * * * *